United States Patent [19]
Ruhe et al.

[11] 3,892,416
[45] July 1, 1975

[54] SEALING MEMBER FOR FLANGED JOINTS

[75] Inventors: Jochen Ruhe; August Beck, both of Triesen, Liechtenstein

[73] Assignee: Balzers Patent-und Beteiligungs Aktiengesellschaft, Liechtenstein

[22] Filed: Dec. 3, 1973

[21] Appl. No.: 420,895

[30] Foreign Application Priority Data
Aug. 22, 1973 Switzerland.................... 012103/73

[52] U.S. Cl. .................... 277/29; 277/70; 277/184
[51] Int. Cl. ............................................. F16j 15/10
[58] Field of Search .................... 277/2, 29, 70–79, 277/180–186

[56] References Cited
UNITED STATES PATENTS
3,141,685  7/1964  Watts .................................. 277/2
3,153,541  10/1964  Rudder ............................. 277/180
3,167,322  1/1965  Aichroth ........................... 277/180

*Primary Examiner*—Robert I. Smith
*Attorney, Agent, or Firm*—McGlew and Tuttle

[57] ABSTRACT

A sealing member for flanged connections includes a seal ring which is supported inwardly by a backing ring and which is enclosed outwardly by an outer ring. The construction is characterized by the formation rabbet on the outer ring on its side which faces the seal ring and which forms a circular groove with the seal ring which is provided with an opening establishing a communication of the groove with the outside of the sealing member.

2 Claims, 4 Drawing Figures

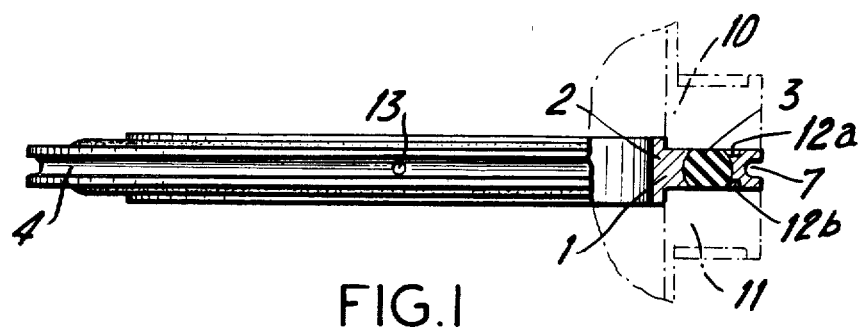
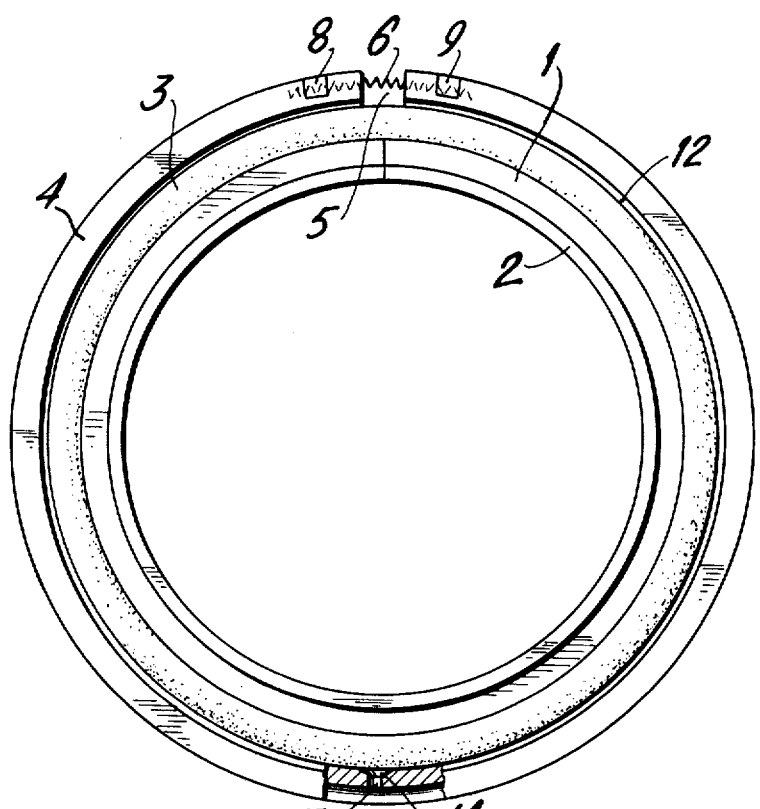
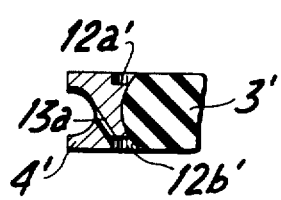
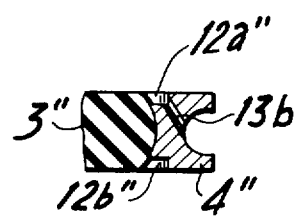

SEALING MEMBER FOR FLANGED JOINTS

BACKGROUND OF THE INVENTION

1. Field of the Invention

This invention relates in general to the construction of sealing members and in particular to a new and useful sealing member which is adapted to be inserted between two sealing surfaces and which comprises a backing ring and a seal ring arranged between the backing ring and a radially outer ring and which includes a groove formation on the outer ring adjacent the seal ring which communicates with the radial outer exterior of the sealing member.

2. Description of the Prior Art

A known sealing ring includes a backing ring supporting a seal ring which is interposed between the backing ring and an outer ring. The outer ring is intended to prevent the soilage of the seal ring and during the establishment of a flanged joint it is designed to prevent canting which is caused by a non uniform tightening of the flanges and also a deformation of the seal ring in the radial outward direction in case of an excessive internal pressure. The assembled parts of the sealing mdmber must hold firmly together so as to render the member manipulable as a whole and also so that it will not fall into individual pieces for example during the insertion between the flanges. To this end the outer diameter of the backing ring and the inner diameter of the outer ring are dimensioned so that while squeezing the seal ring an appropriate radial force is produced which holds the member assembled.

Another known sealing member construction for hermetically sealed flanged joints which include a seal ring supported by a backing ring comprises an outer ring which is not closed but has a gap between two free ends of the outer ring which is bridged by a resilient connection. Sealing rings comprising outer rings show a drawback in that the leak detection of the sealing member is difficult. According to a well known method the joint to be tested for leakage is sprayed with a test gas, for example helium, and the penetration of the gas into the evacuated space through the leaky point is detected with the aid of a sensing element responsive to the test gas. The penetration of the test gas to the points of the leak is blocked by the outer ring so that particularly small leakage is not indicated at all or only with a delay. Of course it is possible to increase the sensitivity and accelerate the indication by spraying the flanged joint which is to be tested for leakage with test gas applied in greater proportion. However the possibility that the gas will simultaneously penetrate into the interior through other leaks in the vicinity is sufficient so that detection along the seal ring becomes indefinite.

SUMMARY OF THE INVENTION

In accordance with the present invention there is provided a sealing member construction which avoids the drawbacks of the prior art and permits the rapid detection of the leakage particularly in the sealing member itself. The inventive sealing member for flanged joints includes a seal ring supported by a backing ring and enclosed by an outer ring which includes a side facing the seal ring which is provided with a rabbet which extends along the seal ring and forms a circular groove therewith and wherein the outer ring is interrupted by a gap which communicates with the circular groove. A sealing member thus formed with a leakage detection groove makes it possible to introduce the test gas directly to the seal ring so that the gas becomes uniformly distributed along the circumference of the seal ring itself and permits the detection of any leakage without delay.

Accordingly it is an object of the invention to provide an improved seal ring construction which comprises a seal ring supported by a backing ring and enclosed by an outer ring and wherein the outer ring is provided with a rabbet on its side facing the seal ring which defines a circular groove with the seal ring and is provided with an opening which establishes a communication of the groove with the exterior of the sealing member.

A further object of the invention is to provide a sealing member which is simple in design, rugged in construction and economical to manufacture.

BRIEF DESCRIPTION OF THE DRAWINGS

In the Drawings:

FIG. 1 is an end view, partly in section of a sealing member constructed in accordance with the invention;

FIG. 2 is a plan view of the ring shown in FIG. 1 with a portion thereof being shown in section;

FIG. 3a is a section through the ring shown in FIG. 2 but showing another embodiment of rebbat construction; and FIG. 3b is a view similar to FIG. 3a of still another embodiment of the invention.

GENERAL DESCRIPTION OF THE PREFERRED EMBODIMENT

Referring to the drawings in particular the invention embodied therein as shown in FIG. 1 comprises a sealing member including a backing ring 1 which is provided with a centering collar portion 2 which may be made for example of aluminum. The backing ring 1 supports a seal ring 3 which is made of an elastic material such as rubber or of a soft metal and it is enclosed by an outer ring 4. The outer ring 4 is not completely closed but is interrupted by a gap 5 which is bridged by a tension spring 6. The tension spring 6 is inserted in an annular groove 7 provided on the outside of the outer ring and the spring is fixed to the spring member by crimping the outer ring at 8 and 9 into tight engagement with the spring 6. Thus, the radial force exerted on the seal ring can be adjusted by a corresponding biasing of the spring 6 and the sealing member can be easily disassembled for example to replace a seal ring 3. Instead of a tension spring it is also possible to use another elastic connection element for holding together the two free ends of the open outer ring 4.

In use the described sealing member is inserted between two sealing surfaces of two flanges 10 and 11. The flanges 10 and 11 are pressed together by clamps or other known means and the sealing effect is produced by an elastic or plastic deformation of the seal ring 3. In accordance with the invention there is provided a rabbet or leakage detection groove 12 in either one or both side facing flanges. The rabbet is formed along the inner circumference of the outer ring 4 and the groove is defined between the outer ring and the seal ring 3 and in the embodiment indicated it is circular in form. With the inventive construction the groove communicates with an opening or passage to the outer periphery of the ring and in the example shown this is provided by the radial gap 5 which provides a communicating passage through which a test gas can be introduced into the grooves.

The construction shown in FIG. 2 indicates another form which may be applied in addition to or independently of the radial gap 5 and this comprises a circular groove or recess 14 which communicates to the outer periphery of the ring through a passage 13.

An outer ring such as the outer ring 4 having the leakage detection grooves constructed in accordance with the invention has the particular advantage that the test gas which is introduced therein will act on all of the leaky areas or points even those which are of different size and which are distributed along the whole circumference and with an approximately equal pressure so that the total volume of the test gas which has penetrated into the evacuated interior through all of the leaky points represents a proportional measure of the leakage. In the hitherto usual blowing oa a test gas jet against the outside of the outer ring the penetrated gas quantity always depended upon the unknown flow resistance offered by the indefinite joint gap between the outer ring and the flange surfaces applied against the latter in varying degrees of tightness so that the real leakage of the seal ring could hardly be inferred from the reading of a leakage detector instrument which showed the quantity of the penetrated gas. With the invention however each of the leakage detection 12a and 12b as shown in FIG. 1 which are adjacent the sealing ring 3 are associated with a separate bore provided in the outer ring for applying the test gas. In such a case the two sealing joints between the seal member and the respective flanges may be tested independently of each other.

In the embodiment shown in FIGS. 3a and 3b similar parts are similarly designated but with primes and double primes respectively. In these separate embodiments one or more of the outer grooves 12a' and 12b' as shown in FIG. 3a and 12a" and 12b" as shown in FIG. 3b communicate with the outer periphery of the ring through separate passages such as the passage 13a shown in FIG. 3a or the passage 13b shown in FIG. 3b which are provided for supplying the test gas. Such a construction is particularly recommendable for sealing members having a large diameter.

While a specific embodiment of the invention has been shown and desxribed in detail to illustrate the application of the principles of the invention, it will be understood that the invention may be embodied otherwise without departing from such principles.

What is claimed is:

1. A sealing member for sealing the area between flange connections comprising an inner backing ring, a seal ring disposed around the periphery of said backing ring, an outer ring disposed around the periphery of said seal ring, said outer ring having a rabbet in the form of a groove adjacent the seal ring, said outer ring having an opening establishing communication of the groove with the outside, said outer ring being provided with a groove on each side face, the opening establishing communication with the exterior of said outer ring comprising a separate passage for each groove.

2. A sealing member for sealing the area between flange connections comprising an inner backing ring, a seal ring disposed around the periphery of said backing ring, an outer ring disposed around the periphery of said seal ring, said outer ring having a rabbet in the form of a groove adjacent the seal ring, said outer ring having an opening establishing communication of the groove with the outside, said backing ring having a laterally extending flange on each side and having an outer periphery with a recess, said sealing ring being of resilient material and engaging in said recess, said outer ring having a complementary recess bearing against said sealing ring from the outside and including an outer periphery having an annularly extending indentation defined therein, said outer ring comprising an incomplete ring with spaced apart end portions, a spring extending between the spaced apart end portions and said outer ring being indented into engagement with the respective ends of said spring.

* * * * *